(12) United States Patent
Adkisson et al.

(10) Patent No.: US 7,424,653 B2
(45) Date of Patent: Sep. 9, 2008

(54) SYSTEM AND METHOD FOR ERROR CAPTURE AND LOGGING IN COMPUTER SYSTEMS

(75) Inventors: Richard W. Adkisson, Dallas, TX (US); Huai-Ter V. Chong, Dallas, TX (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 722 days.

(21) Appl. No.: 10/434,925

(22) Filed: May 9, 2003

(65) Prior Publication Data

US 2004/0225948 A1 Nov. 11, 2004

(51) Int. Cl.
*G11C 29/00* (2006.01)

(52) U.S. Cl. .................... 714/723; 714/776
(58) Field of Classification Search .......... 714/776, 714/723

See application file for complete search history.

(56) References Cited

U.S. PATENT DOCUMENTS

| | | | |
|---|---|---|---|
| 4,443,849 A | 4/1984 | Ohwada | |
| 5,226,150 A | 7/1993 | Callander et al. | |
| 5,291,600 A | 3/1994 | Lutz et al. | |
| 5,390,356 A * | 2/1995 | Houlberg | 703/23 |
| 5,432,815 A * | 7/1995 | Kang et al. | 375/145 |
| 5,649,096 A | 7/1997 | Desubijana et al. | |
| 5,659,720 A | 8/1997 | Fiacco et al. | |
| 5,680,599 A | 10/1997 | Jaggar | |
| 5,701,433 A | 12/1997 | Moriarty et al. | |
| 5,799,305 A | 8/1998 | Bortvedt et al. | |
| 5,841,969 A | 11/1998 | Fye | |
| 5,845,097 A | 12/1998 | Kang et al. | |
| 5,862,316 A * | 1/1999 | Hagersten et al. | 714/15 |
| 5,872,966 A | 2/1999 | Burg | |
| 5,933,614 A | 8/1999 | Tavallaei et al. | |
| 5,982,296 A * | 11/1999 | Wakasa et al. | 370/392 |
| 5,987,555 A | 11/1999 | Alzien et al. | |
| 6,012,148 A | 1/2000 | Laberge et al. | |
| 6,145,044 A | 11/2000 | Ogura | |
| 6,195,722 B1 | 2/2001 | Ram et al. | |
| 6,230,282 B1 | 5/2001 | Zhang | |
| 6,307,860 B1 * | 10/2001 | Joffe et al. | 370/412 |
| 6,338,151 B1 | 1/2002 | Yudenfriend et al. | |
| 6,473,826 B1 | 10/2002 | Allingham | |

(Continued)

FOREIGN PATENT DOCUMENTS

EP   0 772 136   5/1997

(Continued)

OTHER PUBLICATIONS

Affidavit of Richard W. Adkisson, Feb. 17, 2005, 4 pages.

(Continued)

*Primary Examiner*—Guy J. Lamarre

(57) ABSTRACT

Disclosed are systems and methods for logging errors comprising at least one register for storing header packet information, a controller operable to determine if a received packet of one or more packets forming an information communication comprises a header packet and to store the header packet in said at least one register, and error logging circuitry coupled to the register operable to create an error log entry using header information retrieved from the register when an error is detected with respect to any of the one or more packets of the information communication.

28 Claims, 2 Drawing Sheets

U.S. PATENT DOCUMENTS

| | | | |
|---|---|---|---|
| 6,526,433 B1 | 2/2003 | Chang et al. | |
| 6,671,704 B1 | 12/2003 | Gondi et al. | |
| 6,708,269 B1 | 3/2004 | Tiruvallur et al. | |
| 6,892,331 B2 | 5/2005 | Da Palma et al. | |
| 6,961,865 B1 | 11/2005 | Ganesh et al. | |
| 7,002,823 B1 * | 2/2006 | Ichiriu | 365/49 |
| 2001/0044861 A1 * | 11/2001 | Niwa et al. | 710/22 |
| 2002/0004851 A1 | 1/2002 | Matena et al. | |
| 2003/0084364 A1 | 5/2003 | Jakubiec | |
| 2004/0236982 A1 * | 11/2004 | Greer | 714/2 |

FOREIGN PATENT DOCUMENTS

| | | |
|---|---|---|
| JP | 9-251412 | 9/1997 |

OTHER PUBLICATIONS

Chris Greer, Patent Application, entitled "System and Method for In-Order Queue Draining," filed May 9, 2003.

Richard W. Adkisson, et al., Patent Application, entitled "System and Method for Determining Transaction Time-Out," filed May 9, 2003.

Richard W. Adkisson, et al., Patent Application, entitled "Systems and Methods Controlling Transaction Draining for Error Recovery," filed May 9, 2003.

* cited by examiner

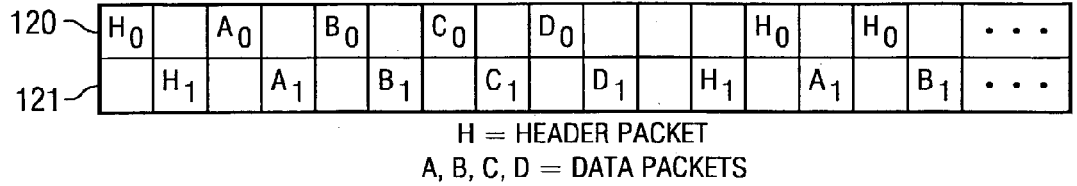
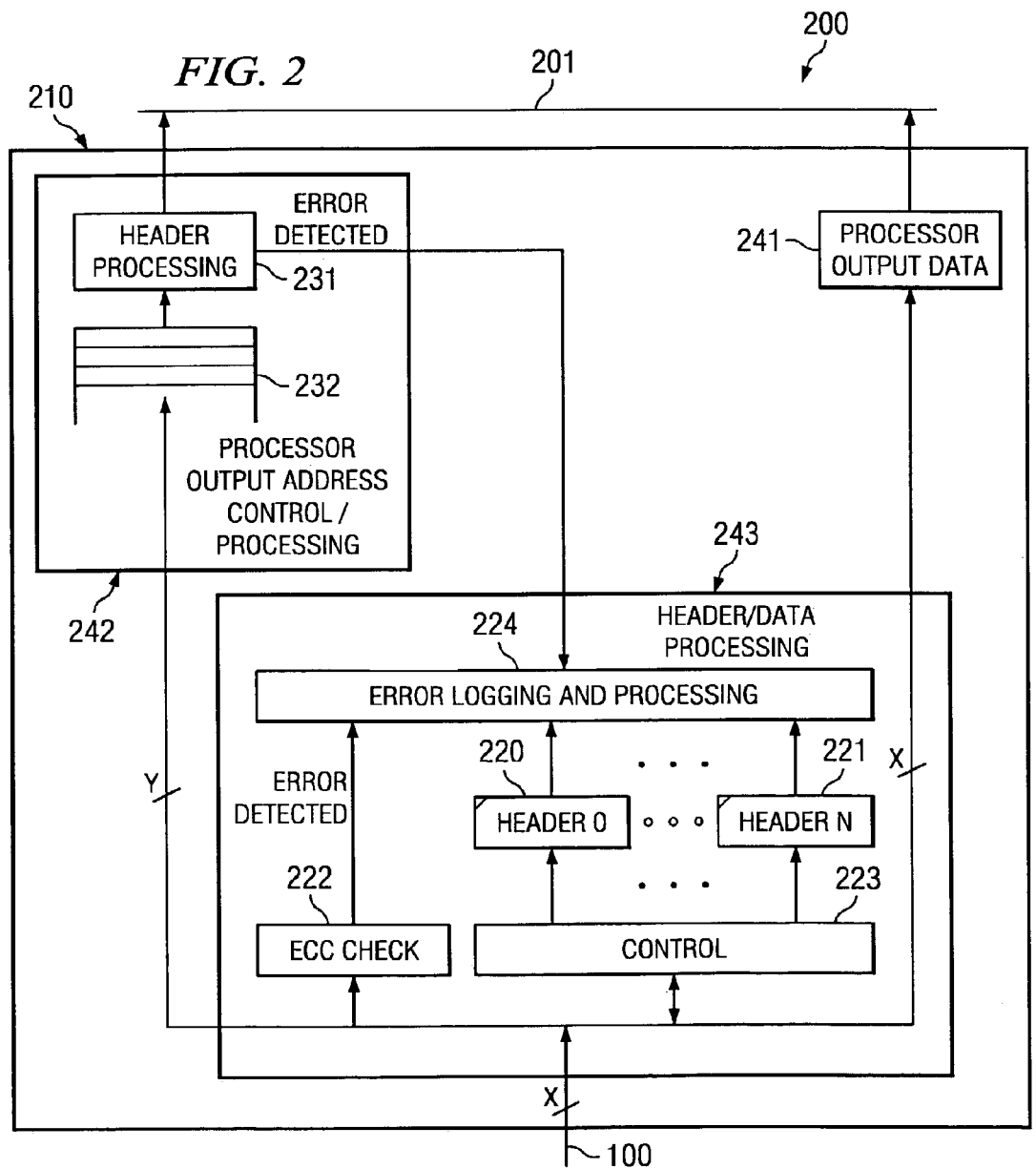

SYSTEM AND METHOD FOR ERROR CAPTURE AND LOGGING IN COMPUTER SYSTEMS

CROSS-REFERENCE TO RELATED APPLICATIONS

The present application is related to concurrently filed, co-pending and commonly assigned U.S. patent applications Ser. No. 10/435,127, filed May 9, 2003, entitled "System and Method for Determining Transaction Time-Out Circuit," Ser. No. 10/434,920, filed May 9, 2003, entitled "Systems and Methods Controlling Transaction Draining for Error Recovery," and Ser. No. 10/434,685, filed May 9, 2003, entitled "System and Method for In-Order Queue Draining," the disclosures of which are hereby incorporated herein by reference.

BACKGROUND

It is not uncommon today for a computer system to be quite complex, often including multiple processors configured to provide parallel and/or distributed processing. For example, multi-processor computer systems often include not only multiple main processing units (MPUs), but may also include multiple support processors or agents, such as memory processors and the like. These various processors, as well as other system resources such as memory, input/output devices, disk devices, and the like, may be distributed throughout the computer system with communication provided by various buses. For example, a computer system may comprise a number of sub-modules, referred to herein as cells or cell cards, having a number of system resources, such as main processing units (MPUs), memory processors, agents, and/or memories, and buses disposed thereon. System resources of a sub-module may make and/or service requests to and/or from other system resources. Such system resources may be associated with the same sub-module and/or other sub-modules of the system.

If an error in operation of any aspect of the system, such as with respect to any one of the aforementioned system resources, is detected by the system, an error signal may be generated to notify the appropriate system resources. Such errors may be non-critical, such as isolated to the operation of a single system resource and/or associated with a recoverable operation. However, such errors may be critical in nature, such as requiring initialization of an entire bus and, therefore, the system resources thereon.

Irrespective of the severity of the error, it is generally desirable to log such errors to facilitate identifying the source of the error, the affected system resources, etcetera. However, the aforementioned complex system architectures can introduce difficulties with respect to identifying, capturing, and/or logging errors. For example, errors may be detected at various stages of processing particular data packets, resulting in information useful in error logging not being available when an error is detected.

SUMMARY

A system for logging errors, the system comprising, at least one register for storing header packet information, a controller operable to determine if a received packet of one or more packets forming an information communication comprises a header packet and to store the header packet in the at least one register, and error logging circuitry coupled to the register operable to create an error log entry using header information retrieved from the register when an error is detected with respect to any of the one or more packets of the information communication.

A method for logging errors, the method comprising, receiving one or more packets of an information communication via a multi-channel bus at an interface for outputting on a second bus, storing a received header packet of the information communication in a register corresponding to a channel of the multi-channel bus the header packet was received on, passing at least a portion of the header packet for processing by the interface for outputting on the second bus, and creating an error log entry using header information retrieved from the register in response to detecting an error with respect to any of the one or more packets of the information communication by the interface.

A method for logging errors, the method comprising, receiving one or more packets of an information communication at an interface, determining if a received packet comprises a header packet and storing the header packet in a corresponding register, passing at least a portion of the header packet for processing by the interface prior to receipt of any corresponding data packets of the information communication, generating an error signal if an error is detected by the interface with respect to any of the one or more packets, and creating an error log entry using header information retrieved from the register in response to the generated error signals.

A computer program product having a computer readable medium having computer program logic recorded thereon for logging errors, the computer program product comprising, code for storing header packet information in an appropriate register of a plurality of registers, registers of the plurality of registers being assigned to different channels of a communication protocol, wherein the header packet information corresponds to a header packet of an information communication comprising one or more packets, and code for creating an error log entry using header information retrieved from the register when an error is detected with respect to any of the one or more packets of the information communication.

BRIEF DESCRIPTION OF THE DRAWINGS

FIG. 1 shows a bus implementing channelized information communication according to an embodiment of the present invention;

FIG. 2 shows a portion of a multi-processor system in which an embodiment of the present invention is implemented;

DETAILED DESCRIPTION

Figure 3A:
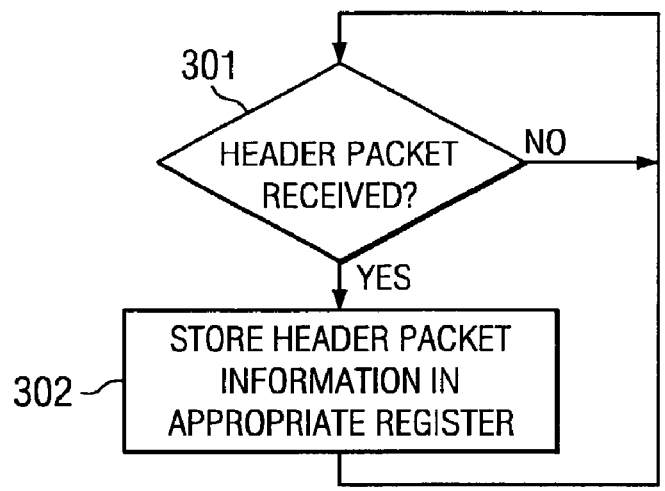
FIG. 3A shows a flow diagram of an aspect of header/data processing control operation according to an embodiment of the present invention.

Embodiments of the present invention provide systems and methods in which data processing header information, such as may be associated with data packets of memory returns or other transactions performed within a computer system, is held during processing of the header, and perhaps associated data packets, to facilitate error logging. According to a preferred embodiment, when an error is detected with respect to a header or any associated data packet, the aforementioned header information may be utilized in intelligently logging the error, such as to include the source of the header/data, the destination of the header/data, the type of data, the type of transaction, etcetera.

Embodiments of the invention are particularly well suited for use in providing error capture and/or logging in association with multi-channel architectures. For example, various resources of complex host systems, such as the aforementioned multi-processor systems, may be shared in order to improve operating efficiency, reduce latencies, etcetera. Accordingly, a bus or buses may be shared between various system resources, including processors and memories. Particular systems may, for example, provide a very wide bus, such as on the order of 288 bits wide, for facilitating high bandwidth communication between system resources. However, such system resources, although utilizing such bandwidth in bursts such as associated with data packet transmission, may be unable to continually utilize the available bandwidth. For example, a system resource may receive a data packet over such a bus, and during processing of the received data packet be unable to utilize available bus bandwidth. Accordingly, systems may implement a bus protocol in which bus channelization schemes provide multiple access techniques, e.g., time division multiple access. Embodiments of the present invention may provide for header information storage for error capture and/or logging irrespective of a number of channels implemented with respect to a resource.

Generally speaking, information flowing between various system resources in a computer system will be provided to an interface for processing, etcetera (see e.g., the processor interfaces shown and described in the above referenced patent applications entitled "Systems and Methods Controlling Transaction Draining for Error Recovery" and "System and Method for In-Order Queue Draining"). Such information may be packetized for communication in manageable blocks. These packets may comprise a data packet or packets, such as may contain the actual data payload of the information communication and perhaps including overhead data, such as error checking and correction (ECC) data, routing data, etcetera. Additionally or alternatively, these packets may comprise a header packet, such as may include information with respect to the source of data, a destination of data, a type of data, transaction identification, etcetera, and perhaps including overhead data, such as ECC data. According to one embodiment, the aforementioned header packets may be transmitted without corresponding data packets, such as for a read to memory or a recall to a processor. However, according to this embodiment, data packets will not be transmitted without a corresponding header packet, so as to facilitate proper processing and/or handling of data packets.

When implementing an embodiment of the aforementioned bus channelization technique, packets of the various channels may be interleaved as received by an interface. Accordingly, information transmission may comprise one or more packets, as may be separated by packets of various other channels sharing a particular resource.

Although a simplified technique may have a particular interface await all associated packets, of an information communication, e.g., a header packet perhaps followed by one or more data packets, such a technique can result in less than optimized system performance and, in particular result in appreciable latencies associated with awaiting receipt of all data packets associated with a particular header. Bus channelization techniques further aggravate the aforementioned latencies as receipt of data packets associated with a particular header may be further delayed due to interleaving of packets of a separate channel.

Accordingly, embodiments provide for processing of received packets by an interface irrespective of whether all packets associated with a particular information communication have been received. For example, once a header packet is received, the interface may process the header information to request a particular bus for providing the associated data (not yet receive by the interface) to a proper system resource. Such requests may require time to fulfill and, therefore, processing the header information to invoke the request prior to actual receipt and/or processing of associated data packets may optimize system performance.

However, it should be appreciated that errors may be detected at various stage of processing the aforementioned header packet. For example, an error may be detected in the header itself during its receipt by the interface, such as through ECC data checking. Additionally an error may be detected in the header during its processing by the interface, such as determining that the header is associated with a tracked transaction that has already ostensibly been completed or that the header is associated with a source which is not allowed to provide data communication via the interface. An error may also be detected with respect to one or more data packets associated with a header. For example, an error may be detected in a data packet during its receipt by the interface, such as through ECC data checking.

According to embodiments, a header packet could be in a number of different places when an associated error is detected. When such an error is detected, however, it is desirable to log that error in an intelligent way, such as to include information available only in the header packet. Accordingly, embodiments of the present invention implement a header information slot for storing information with respect to a particular information communication received at an interface. Preferably, such a header information slot is provided for each of a plurality of channels in a channelization scheme, to thereby facilitate error logging with respect Directing attention to FIG. 1, a multi-channel bus protocol is illustrated with respect to information communication via bus 100. The illustrated embodiment provides channel 120 and 121, wherein information associated with various system resources may be communicated via bus 100 separately. Specifically, alternate time slots are assigned to each channel of the illustrated embodiment to provide a time division multiplexing (TDM) or time division multiple access (TDMA) bus channelization protocol. Of course, although only 2 channels are shown, any number of channels may be accommodated according to the concepts of the present invention. Moreover, embodiments of the present invention are not limited to use with time division channelization techniques and, therefore, may be implemented with respect to any number of channelization schemes and combinations thereof.

In the illustrated embodiment of bus 100, packets denoted as "H" represent header packets and packets denoted as other letters, e.g., "A", "B", "C", and "D", represent data packets, where packets denoted as "0" are associated with a first channel, e.g., channel 0, and packets denoted as "1" are associated with a second channel, e.g., channel 1. Accordingly, it can be seen that illustrated two channel interface provides for information associated with channel 0 in a first cycle or time slot, information associated with channel 1 in a second cycle or time slot, information associated with channel 0 in a third cycle or time slot, and so on.

This channelization scheme facilitates optimized use of a resource, such as a very wide bus which is not economically duplicable within the host system, by effectively allowing multiple decoupled information communications simultaneously. For instance, if a memory system can only produce a packet about half the speed at which packets may be transmitted and/or processed, and there are a plurality of memory systems in the host, the aforementioned channelization scheme facilitates communication of packets associated with multiple memory systems simultaneously.

Referring again to FIG. 1, it can be seen that if processing with respect to a particular information communication (here being all packets including a header packet and any subsequent data packets up to, but not including, a subsequent header packet) may require an appreciable amount of time if such processing is withheld until all associated packets are received. For example, in the first example of information communication in channel 120, wherein header packet H0 and data packets A0, B0, C0, and D0 are communicated via bus 100, 9 cycles transpire before all packets associated with the information communication are received. Although awaiting receipt of all such packets simplifies error processing, allowing processing of particular packets, such as the header packet to set up additional system resources for processing of subsequent data packets, facilitates optimized system performance and/or decreased latencies.

Directing attention to FIG. 2, a portion of a host system in which an embodiment of the present invention is deployed is shown generally as system portion 200. The host system of which system portion 200 is a part of may comprise a multiprocessor system, such as a Hewlett Packard rx series server system implementing a plurality of Intel ITANIUM processors.

System portion 200 of the illustrated embodiment includes processor interface 210 disposed between bus 201, such as may have one or more processors and/or other system resources disposed thereon (not shown), and bus 100, such as may have memory systems and/or other system resources disposed thereon (not shown). Processor interface 210 of the illustrated embodiment includes processor output data block 241, processor output address control/processing block 242, and header/data processing block 243. Header/data processing 243 of the illustrated embodiment provides processing of packets that are coming into interface 210 via bus 100, such as to provide information with respect to received header packets to processor output address control/processing 242 and information with respect to received data packets to processor output data 241. Processor output address control/processing block 242 and processor output data block 241 of the illustrated embodiment preferably cooperate with header/data processing block 243 to output header and data information on bus 201 from information communication received on bus 100.

For example, a packet may be processed by header/data processing 243 to determine if the packet includes a bit error through operation of ECC check 222, as is well known in the art Header/data processing 243 may also determine if the packet is a header packet or a packet for providing the packet, or some portion thereof, to an appropriate one of processor output address control/processing 242 and processor output data 241. For example, if the packet is a header packet, some portion of the packet may be stripped (e.g., from X bits to Y bits), such as to remove the ECC block and/or redundant fields, and the packet information provided to processor output address control/processing 242 for processing as a header packet. Processor output address control/processing 242 may provide various functions, such as header processing 231 requesting bus 201 and manipulating the header information for placing on bus 201. Additionally, processor output address control/processing 242 may provide queuing of header information in header queue 232.

As previously mentioned, to optimize utilization of bus 100, the bus protocols used therewith may employ channelization techniques, such as the aforementioned time division multiple access techniques. Accordingly, packets associated with N separate channels may be received by interface 210.

Packet errors which should be logged may be detected at various stages of processing aforementioned packets by interface 210. For example, an error may be detected by ECC check block 222 as a header packet is initially processed by header/data processing 243, before any associated data packets have been received by interface 210. Additionally or alternatively, an error may be detected as header information is processed by header processing block 231, perhaps after one or more associated data packets have been received by interface 210. Likewise, an error may be detected by ECC check block 222 as a data packet is initially processed by header/data processing 243, perhaps after processor output address control/processing 242 has completed processing of associated header data and placed the header information on bus 201.

According to embodiments of the present invention, header information is logged with respect to captured errors in order to provide an intelligent error log. For example, such header information may be utilized to determine where the packet has come from, where the packet is going, what the packet is, etcetera. However, ensuring header information, particularly the complete header packet information, is available for error capturing and logging typically entails awaiting receipt of not only the header packet but all associated data packets, as it is not known a priori where an error in the information communication is going to occur. From the above discussion it should be readily appreciated that awaiting receipt of all packets of an information communication, particularly when channelization techniques are employed, can result in an inability to achieve optimum system performance and appreciable latencies. Accordingly, embodiments of the invention provide for storage of header information, e.g., complete header packets as received from bus 100, by interface 210 until processing with respect to a complete information communication (e.g., a header packet and any associated data packets) is complete.

Referring still to FIG. 2, registers 220-221, associated with bus channels 1-N, are shown for storing header information. According to one embodiment, control 223 provides header information (e.g., all X bits of a header packet as received from bus 100) for each channel of bus 100 to a corresponding one of registers 220-221.

In operation according to an embodiment of the present invention, a header packet associated with a particular channel of bus 100 is placed in a corresponding one of registers 220-221 by control 223 substantially immediately upon receipt of the header packet by interface 210, thereby overwriting any previous header information held in that particular register. For example, as shown in the flow diagram of FIG. 3A control 233 may analyze each packet received from bus 100 to determine if it is a header packet or a data packet (box 301). If the packet is not a header packet, processing may loop back for a determination with respect to a subsequent packet. However, if the packet is a header packet, processing may proceed such that the header packet, or some desired portion thereof, is stored in an appropriate one of registers 220-221 (box 302).

Through operation of the flow diagram of FIG. 3A, the header information is held in its corresponding register until such time as a subsequent header packet associated with that particular channel is received by interface 210. Accordingly, appropriate header information will be held by one of registers 220-221 throughout all stages of processing an information communication and, as error logging and processing 224 captures an error, an intelligent log may be made which includes any or all information available from the header packet.

Figure 3B:
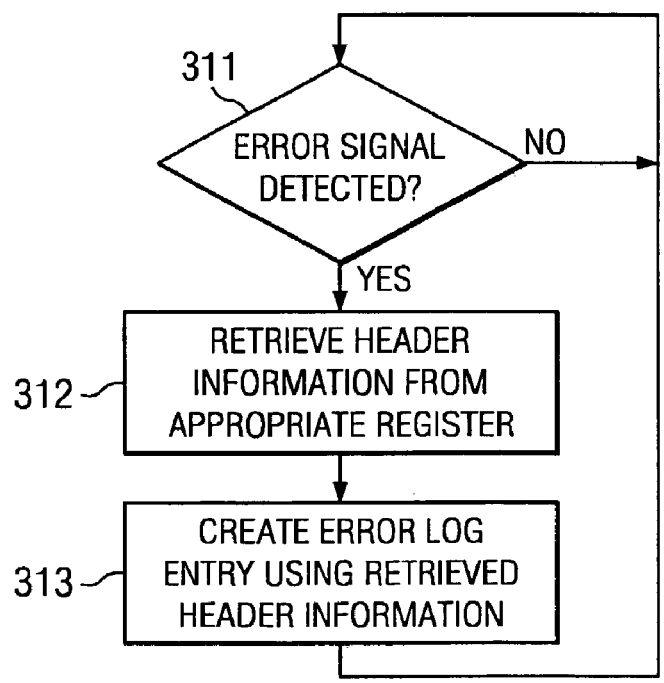
FIG. 3B shows a flow diagram of an aspect of header/data processing error logging and processing operation according to an embodiment of the present invention.

As can be seen in the embodiment of FIG. 2, irrespective of which point in the processing of a header information or at what point any associated data packets are received by interface 210, robust header information will be available to error logging and processing 224 when an error is captured. For example, directing attention to FIG. 3B, if an error is detected by ECC check 222 with respect to a header packet as processed by header/data processing 243, e.g., a bit error is detected, an error signal may be provided to error logging and processing 224 (box 311) to retrieve the header packet or desired portions thereof from a corresponding one of registers 220-221 (box 312), and an intelligent error log entry created (box 313). Similarly, if an error is detected by header processing 231, e.g., the header is determined to have come from an illegal source or is associated with an already completed transaction, an error signal may be provided to error logging and processing 224 (box 311) to retrieve the header packet or desired portions thereof from a corresponding one of registers 220-221 (box 312), and an intelligent error log entry created (box 313). Likewise, if an error is detected by ECC check 222 with respect to a data packet as processed by header/data processing 243, e.g., a bit error is detected, an error signal may be provided to error logging and processing 224 (box 311) to retrieve the header packet or desired portions thereof from a corresponding one of registers 220-221 (box 312), and an intelligent error log entry created (box 313). It should be appreciated that the aforementioned intelligent error logs may include such information as the particular type of error detected, such as may be indicated by the particular error signal provided by ECC check 222 and/or header processing 231, as well as information derived from the header information stored in registers 220-221.

It should be appreciated that, irrespective of a particular state of a header packet or its associated data packets being processed by interface 210 (e.g., whether the header packet has just been received, the header information is queued for processing, the header information is being processed for placing on bus 201, or the header information has been fully processed and therefore released from interface 210), embodiments of the present invention provide header packet information for error capturing and logging. Moreover, such header packet information is robust, such as including all relevant information from the original header packet, even where a subset of header information is used for processing by interface 210.

If implemented in software or Microcode, the elements of the present invention are essentially the code segments to perform tasks as described herein. The program or code segments can be stored in a computer readable medium or transmitted by a computer data signal embodied in a carrier wave, or a signal modulated by a carrier, over a transmission medium. The computer readable medium may include any medium that can store or transfer information. Examples of a computer readable medium include an electronic circuit, a semiconductor memory device, a ROM, a flash memory, an erasable ROM (EROM), a floppy diskette, a compact disk CD-ROM, an optical disk, a hard disk, a fiber optic medium, a radio frequency (RF) link, etc. The computer data signal may include any signal that can propagate over a transmission medium such as electronic network channels, optical fibers, air, electromagnetic, RF links, etc. The code segments may be downloaded via computer networks such as the Internet, Intranet, etc.

Although embodiments have been described herein with respect to communication protocols implementing channelization techniques, it should be appreciated that the present invention is not limited to use with any particular channelization technique or the use of channelization whatsoever. Likewise, where channelization is employed, embodiments may accommodate any number of such channels, such as by providing a number of registers sufficient for holding desired information associated with each channel.

What is claimed is:

1. A system for logging errors, said system comprising:
at least one register for storing header packet information;
a controller operable to determine if a received packet of one or more packets forming an information communication comprises a header packet and to store said header packet in said at least one register; and
error logging circuitry coupled to said register operable to create an error log entry using header information retrieved from said register when an error is detected with respect to any of said one or more packets of said information communication.

2. The system of claim 1, wherein said at least one register comprises:
a plurality of registers.

3. The system of claim 2, further comprising:
a multi-channel bus, wherein said one or more packets of said information communication are received via said multi-channel bus and registers of said plurality of registers are assigned to each channel of said multi-channels.

4. The system of claim 3, wherein said at least one register said header packet is stored in by said controller is selected to correspond to a channel upon which said header packet was received.

5. The system of claim 1, wherein said error is detected with respect to a data packet of said information communication after said header packet has been processed.

6. A method for logging errors, said method comprising:
receiving one or more packets of an information communication via a multi-channel bus at an interface for outputting on a second bus;
storing a received header packet of said information communication in a register corresponding to a channel of said multi-channel bus said header packet was received on;
passing at least a portion of said header packet for processing by said interface for outputting on said second bus; and
creating an error log entry using header information retrieved from said register in response to detecting an error with respect to any of said one or more packets of said information communication by said interface.

7. The method of claim 6, wherein said passing said at least a portion of said header packet for processing by said interface is prior to receipt of any corresponding data packets of said information communication.

8. The method of claim 6, wherein said register stores said header packet during processing of all packets of said information communication by said interface.

9. The method of claim 6, further comprising:
overwriting said header packet stored in said register with a header packet of a subsequent information communication received upon said channel of said multi-channel bus.

10. The method of claim 6, wherein said error is detected when said header packet is initially received by said interface.

11. The method of claim 6, wherein said error is detected when said at least a portion of said header packet is processed by said interface.

12. The method of claim 6, wherein said error is detected after said at least a portion of said header packet has been output by said interface.

13. The method of claim 6, wherein said error is detected when a data packet of said information communication is initially received by said interface.

14. The method of claim 6, wherein said error log entry includes information with respect to a source of said information communication.

15. The method of claim 6, wherein said error log entry includes information with respect to a destination of said information communication.

16. The method of claim 6, wherein said error log entry includes information with respect to a type of said information communication.

17. A method for logging errors, said method comprising:
   receiving one or more packets of an information communication at an interface;
   determining if a received packet comprises a header packet and storing said header packet in a corresponding register;
   passing at least a portion of said header packet for processing by said interface prior to receipt of any corresponding data packets of said information communication;
   generating an error signal if an error is detected by said interface with respect to any of said one or more packets; and
   creating an error log entry using header information retrieved from said register in response to said generated error signals.

18. The method of claim 17, wherein said register stores said header packet during processing of all packets of said information communication by said interface.

19. The method of claim 17, further comprising:
   overwriting said header packet stored in said register with a header packet of a subsequent information communication.

20. The method of claim 17, wherein said information communication corresponds to a particular channel of a communication bus, and wherein said register is assigned to said particular channel.

21. The method of claim 17, wherein said error signal is generated when said header packet is initially received by said interface.

22. The method of claim 17, wherein said error signal is generated when said at least a portion of said header packet is processed by said interface.

23. The method of claim 17, wherein said error signal is generated after said at least a portion of said header packet has been output by said interface.

24. The method of claim 17, wherein said error signal is generated when a data packet of said information communication is initially received by said interface.

25. The method of claim 17, wherein said error log entry includes information with respect to a source of said information communication.

26. The method of claim 17, wherein said error log entry includes information with respect to a destination of said information communication.

27. The method of claim 17, wherein said error log entry includes information with respect to a type of said information communication.

28. A computer program product having a computer readable medium having computer program logic recorded thereon for logging errors, said computer program product comprising:
   code for storing header packet information in an appropriate register of a plurality of registers, registers of said plurality of registers being assigned to different channels of a communication protocol, wherein said header packet information corresponds to a header packet of an information communication comprising one or more packets; and
   code for creating an error log entry using header information retrieved from said register when an error is detected with respect to any of said one or more packets of said information communication.

* * * * *

UNITED STATES PATENT AND TRADEMARK OFFICE
CERTIFICATE OF CORRECTION

PATENT NO. : 7,424,653 B2  Page 1 of 1
APPLICATION NO. : 10/434925
DATED : September 9, 2008
INVENTOR(S) : Richard W. Adkisson et al.

It is certified that error appears in the above-identified patent and that said Letters Patent is hereby corrected as shown below:

In column 4, line 33, after "respect" insert -- to each such channel. --.

In column 4, line 55, after "that" insert -- the --.

In column 5, line 51, after "or a" insert -- data --.

In column 6, line 4, after "processing" insert -- the --.

Signed and Sealed this

Twenty-third Day of December, 2008

JON W. DUDAS
*Director of the United States Patent and Trademark Office*